US012461474B2

(12) United States Patent
Goto

(10) Patent No.: US 12,461,474 B2
(45) Date of Patent: Nov. 4, 2025

(54) IMAGE FORMING APPARATUS

(71) Applicant: BROTHER KOGYO KABUSHIKI KAISHA, Nagoya (JP)

(72) Inventor: Keigo Goto, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/477,286

(22) Filed: Sep. 28, 2023

(65) Prior Publication Data

US 2024/0111234 A1 Apr. 4, 2024

(30) Foreign Application Priority Data

Sep. 30, 2022 (JP) ................................ 2022-158655

(51) Int. Cl.
*G03G 15/01* (2006.01)
*G03G 15/00* (2006.01)
(Continued)

(52) U.S. Cl.
CPC ..... *G03G 15/2064* (2013.01); *G03G 15/0435* (2013.01); *G03G 15/5004* (2013.01); *G03G 15/5016* (2013.01); *G03G 15/5087* (2013.01); *G03G 15/60* (2013.01); *G03G 15/751* (2013.01); *G03G 2215/0097* (2013.01); *G03G 2215/0187* (2013.01)

(58) Field of Classification Search
CPC .. G03G 15/205; G03G 15/2039; G03G 15/50; G03G 15/5004; G03G 15/5087
See application file for complete search history.

(56) References Cited

U.S. PATENT DOCUMENTS

2007/0189783 A1* 8/2007 Hattori ................. G03G 15/553 399/16
2010/0247144 A1* 9/2010 Kaneyama ......... G03G 15/0136 399/302
(Continued)

FOREIGN PATENT DOCUMENTS

JP 2006-313452 A 11/2006
JP 2010-228334 A 10/2010
(Continued)

*Primary Examiner* — Thomas S Giampaolo, II
(74) *Attorney, Agent, or Firm* — Baker Botts L.L.P.

(57) ABSTRACT

An image forming apparatus includes a controller configured to perform an acquisition processing of acquiring a preceding command, a preparation processing, and a printing processing. In a case where the controller determines that a performance condition of the printing processing is satisfied, the controller is configured to perform the preparation processing in response to acquisition of the preceding command, and the printing processing in accordance with a print instruction. In a case where the controller determines that the performance condition is not satisfied, the controller is configured not to perform the preparation processing in response to the acquisition of the preceding command. In a case where the controller determines that the performance condition is satisfied after the controller determines that the performance condition is not satisfied, the controller is configured to perform the preparation processing and the printing processing in accordance with the print instruction.

9 Claims, 10 Drawing Sheets

(51) Int. Cl.
*G03G 15/043* (2006.01)
*G03G 15/20* (2006.01)

(56) References Cited

U.S. PATENT DOCUMENTS

| | | | | |
|---|---|---|---|---|
| 2013/0050760 | A1* | 2/2013 | Sakuragi | G06F 3/1229<br>358/1.15 |
| 2021/0382409 | A1* | 12/2021 | Yoshida | G03G 15/0409 |
| 2022/0206423 | A1 | 6/2022 | Kyotani et al. | |
| 2023/0139498 | A1 | 5/2023 | Itogawa | |

FOREIGN PATENT DOCUMENTS

| | | | |
|---|---|---|---|
| JP | 2022-102898 | A | 7/2022 |
| JP | 2023-067159 | A | 5/2023 |

* cited by examiner

IMAGE FORMING APPARATUS

REFERENCE TO RELATED APPLICATIONS

This application claims priority from Japanese Patent Application No. 2022-158655 filed on Sep. 30, 2022. The entire content of the priority application is incorporated herein by reference.

BACKGROUND ART

Regarding an image forming apparatus, there is a technique of shortening time from when an instruction to form an image on a sheet is given to when a rear end of a first sheet is discharged. That is, there is a technique of shortening so-called first print time. A related art describes an image forming apparatus configured to start a preparation processing in response to the acquisition of a preceding command as a trigger before acquisition of print data, thereby shortening the first print time. Here, the preparation processing is a processing of rotating a rotary body of a fuser by a driving force from a motor, and of raising a temperature of a heating roller and of maintaining the temperature. The image forming apparatus described in the related art is configured to acquire information, from the preceding command, for determining a rotational speed of the rotary body of the fuser, configured to determine the rotational speed of the rotary body of the fuser based on the acquired information, and configured to perform the preparation processing of rotating the rotary body of the fuser.

DESCRIPTION

In a configuration in which the image forming apparatus is configured to perform the preparation processing in response to the acquisition of the preceding command, in a case where a performance condition of a printing processing is not satisfied, for example, sheet shortage, the rotation of the rotary body of the fuser may be stopped, and the maintenance of the temperature increase of the heating roller may be stopped. In this case, the preparation processing may be unnecessarily performed since the image forming apparatus performs the preparation processing again in a case where the performance condition of the printing processing is satisfied.

An object of the present disclosure is to prevent performance of an unnecessary preparation processing in an image forming apparatus that can perform the preparation processing before forming an image.

CONFIGURATION OF FIRST EMBODIMENT

Figure 1:
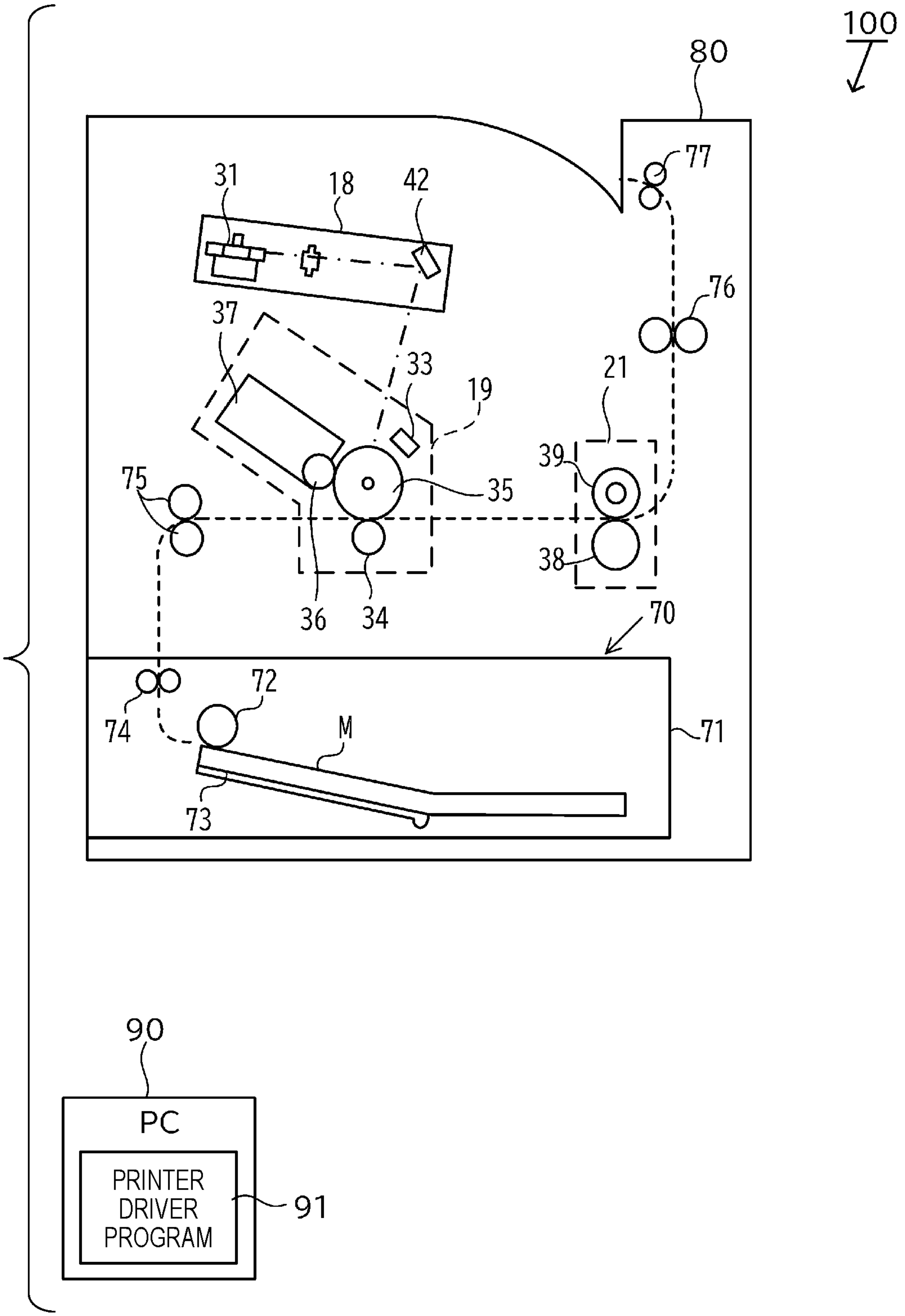
FIG. 1 is a configuration diagram of an image forming system.

Hereinafter, an image forming system according to the present embodiment will be described with reference to the drawings. An image forming system 100 shown in FIG. 1 includes a printer 80 that is an example of an image forming apparatus, and a PC 90 that is an example of an external terminal. The printer 80 and the PC 90 are communicably connected. Although FIG. 1 shows the image forming system 100 including one PC 90, the present invention is not limited thereto. The image forming system 100 may include two or more external terminals. In this case, the external terminals may be apparatuses other than a PC, such as a smartphone and a tablet.

The PC 90 includes a CPU, a memory, a display, and the like, which are not shown. The memory of the PC 90 is configured to store a printer driver program. The CPU of the PC 90 is configured to generate print data using the printer driver program. Hereinafter, the printer driver program is also referred to as a printer driver 91. In this example, the printer driver 91 stored in the memory of the PC 90 is a program provided by the same vendor as a vendor of the printer 80.

Figure 2:
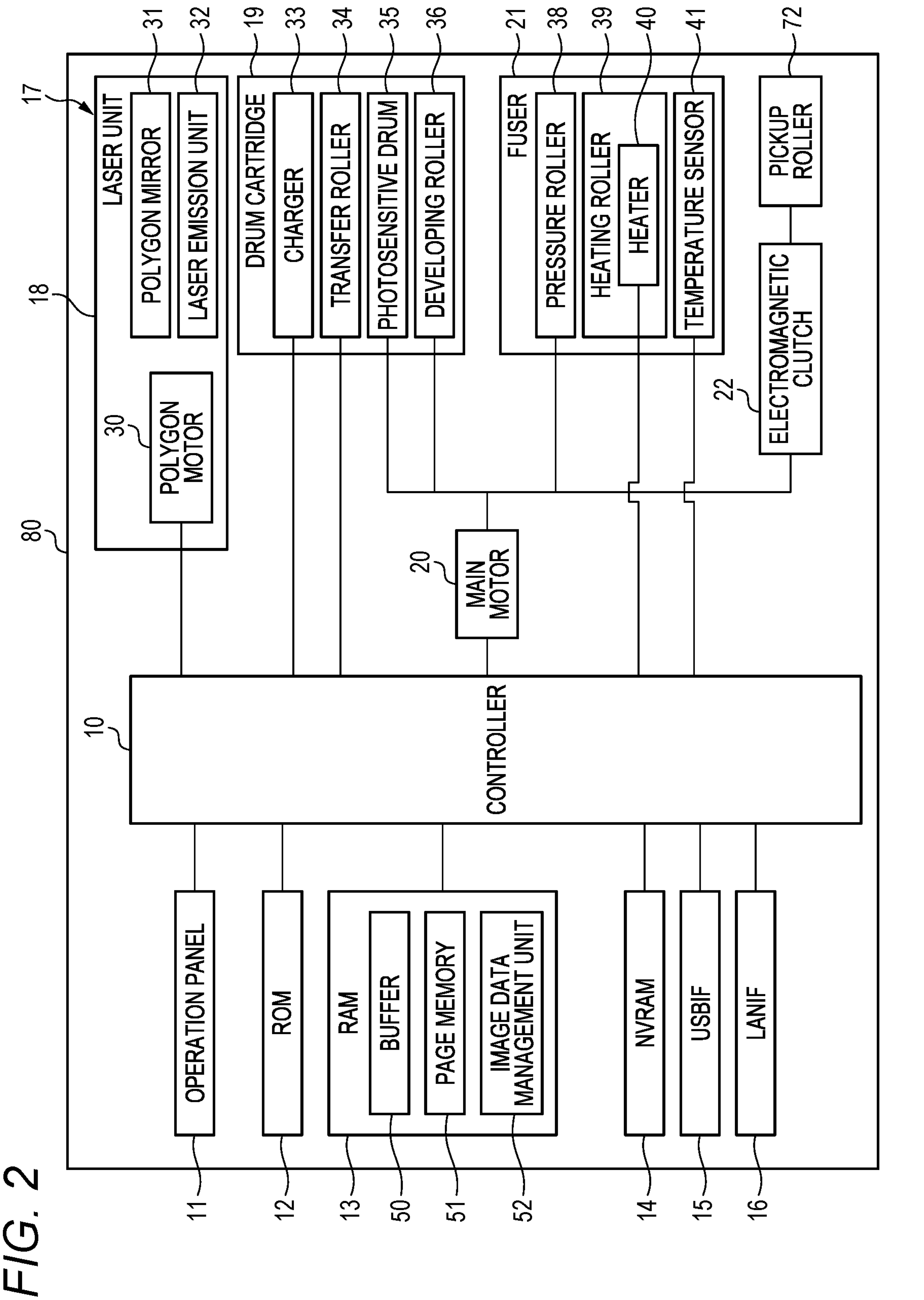
FIG. 2 is a block diagram of a printer.

The printer 80 is a monochrome printer. As shown in FIGS. 1 and 2, the printer 80 includes a controller 10, an operation panel 11, a read only memory (ROM) 12, a random access memory (RAM) 13, a NVRAM 14, a USB IF 15, a local area network (LAN) IF 16, an image forming unit 17, a main motor 20, a fuser 21, and a sheet feeder 70.

The controller 10 is an application specification integrated circuit (ASIC) 10. The controller 10 includes a CPU and a motor driver, which are not shown. The controller 10 is configured to control driving of the printer 80. The ROM 12 is configured to store various programs and parameters for controlling units of the printer 80. The CPU of the controller 10 is configured to load, into the RAM 13, the programs and the parameters stored in the ROM 12 and configured to execute them, to control the units of the printer 80.

The RAM 13 includes a page memory 51 that is an area for temporarily storing image data generated by a RIP processing to be described later, and a buffer 50 that is a work area. The controller 10 is configured to execute a program stored in the ROM 12 to function as an image data management unit 52. In a case where image data for one page is recorded in the page memory 51, the image data management unit 52 is configured to register a print queue corresponding to the image data for one page.

The operation panel 11 is an interface interposed between a user who operates the printer 80 and the controller 10. The operation panel 11 includes, for example, a touch panel portion and operation buttons.

The USB IF 15 and the LAN IF 16 is configured to function as interfaces for connecting the PC 90 and the printer 80 to perform communication. The USB IF 15 is configured to connect the PC 90 and the printer 80 via a USB wired cable. The LAN IF 16 is configured to connect the PC 90 and the printer 80 in a connection format other than USB. The LAN IF 16 is an interface configured to perform wireless LAN communication such as Wi-Fi (registered trademark) or near distance wireless communication with the printer 80. The LAN IF 16 may also be an interface configured to perform wired LAN communication such as Ethernet with the printer 80.

The main motor 20 is configured to supply power to the image forming unit 17, the fuser 21, and the sheet feeder 70, via a power transmission mechanism that is not shown. The main motor 20 is, for example, a DC motor. Driving of the main motor 20 is controlled by a motor driver of the controller 10.

The sheet feeder 70 includes a feed tray 71, a pickup roller 72, a sheet pressing plate 73, a conveying roller 74, and a registration roller 75. The sheet feeder 70 is configured to convey a sheet M placed on the feed tray 71 toward the image forming unit 17. The pickup roller 72 is connected to the main motor 20 via an electromagnetic clutch 22. The controller 10 is configured to switch a state of the electromagnetic clutch 22 between a state in which the power from the main motor 20 is supplied to the pickup roller 72, and a state in which the power from the main motor 20 is not supplied to the pickup roller 72.

In a sheet feeding operation in which the sheet M is fed, the sheet M placed on the feed tray 71 is moved toward the pickup roller 72 by the sheet pressing plate 73, and the sheet M is fed to the conveying roller 74 associated with rotation of the pickup roller 72. The conveying roller 74 is configured to convey the sheet M toward the registration roller 75. The registration roller 75 is configured to align a position of a leading end of the sheet M. The sheet M is conveyed toward the image forming unit 17 by a roller such as the registration roller 75.

The image forming unit 17 is configured to form an image on the sheet M. The image forming unit 17 includes a laser unit 18 and a drum cartridge 19. In the present embodiment, since the printer 80 is a monochrome printer, the image forming unit 17 includes only the drum cartridge 19 corresponding to black.

The laser unit 18 includes a polygon motor 30, a polygon mirror 31, a laser emission unit 32, and a reflection mirror 42. The polygon mirror 31 is a rotary polygon mirror having side surfaces of a regular hexagonal column as six reflection surfaces. The polygon mirror 31 is configured to be rotated by the polygon motor 30. The polygon mirror 31 is configured to deflect, toward a photosensitive drum 35, a light beam emitted from the laser emission unit 32. The polygon motor 30 is, for example, a DC motor. Rotation of the polygon motor 30 is controlled by a motor driver that is not shown provided in the controller 10. The light beam deflected by the polygon mirror 31 scans a surface of the photosensitive drum 35 to be described later, via the reflection mirror 42.

The drum cartridge 19 includes a charger 33, a transfer roller 34, the photosensitive drum 35, a developing roller 36, and a toner container 37. The charger 33 is, for example, a scorotron charger having a charging wire and a grid portion. The charger 33 is configured to uniformly charge the surface of the photosensitive drum 35. The transfer roller 34 is configured to sandwich the sheet M between the transfer roller 34 and the photosensitive drum 35. Black toner is placed in the toner container 37. The developing roller 36 is configured to supply, by rotation, the toner placed in the toner container 37 to the surface of the photosensitive drum 35. The photosensitive drum 35 and the developing roller 36 are connected to the main motor 20. The photosensitive drum 35 and the developing roller 36 are configured to be rotated by power supplied from the main motor 20.

A light beam from the laser unit 18 is emitted to the photosensitive drum 35 charged by the charger 33, and an electrostatic latent image based on image data is formed. The developing roller 36 is configured to supply the toner in the toner container 37 to the photosensitive drum 35 on which the electrostatic latent image is formed. Accordingly, the electrostatic latent image is visualized, and a developer image is formed on the photosensitive drum 35. Thereafter, the sheet M is conveyed to a transfer position between the photosensitive drum 35 and the transfer roller 34, to transfer the developer image formed on the photosensitive drum 35 to the sheet M.

The sheet M to which the developer image is transferred is conveyed to the fuser 21 by the photosensitive drum 35 and the transfer roller 34. The fuser 21 includes a pressure roller 38, a heating roller 39, a heater 40, and a temperature sensor 41. The fuser 21 is configured to thermally fix the developer image formed on the sheet M. The pressure roller 38 is configured to be rotated by the power from the main motor 20. The pressure roller 38 configures a nip portion at which the sheet M is nipped between the pressure roller 38 and the heating roller 39. The heater 40 for raising the temperature of the heating roller 39 is disposed inside the heating roller 39, and the temperature of the heating roller 39 can be raised to a fixing temperature. The heater 40 is, for example, a halogen lamp.

In the present embodiment, the fuser 21 is configured such that the pressure roller 38 is rotated by the main motor 20 and the heating roller 39 is configured to be rotated by following rotation relative to the pressure roller 38. Alternatively, the fuser 21 may be configured such that the heating roller 39 is rotated by the main motor 20 and the pressure roller 38 is configured to be rotated by following rotation relative to the heating roller 39.

The sheet M on which the developer image is thermally fixed by the fuser 21 is discharged to a discharge tray by a conveying roller 76 and a discharge roller 77.

Next, a procedure of a processing for generating print data by the printer driver of the PC 90 will be described with reference to FIG. 3. In this example, the printer driver 91 of the PC 90 is a program provided by the vendor of the printer 80.

Figure 3:
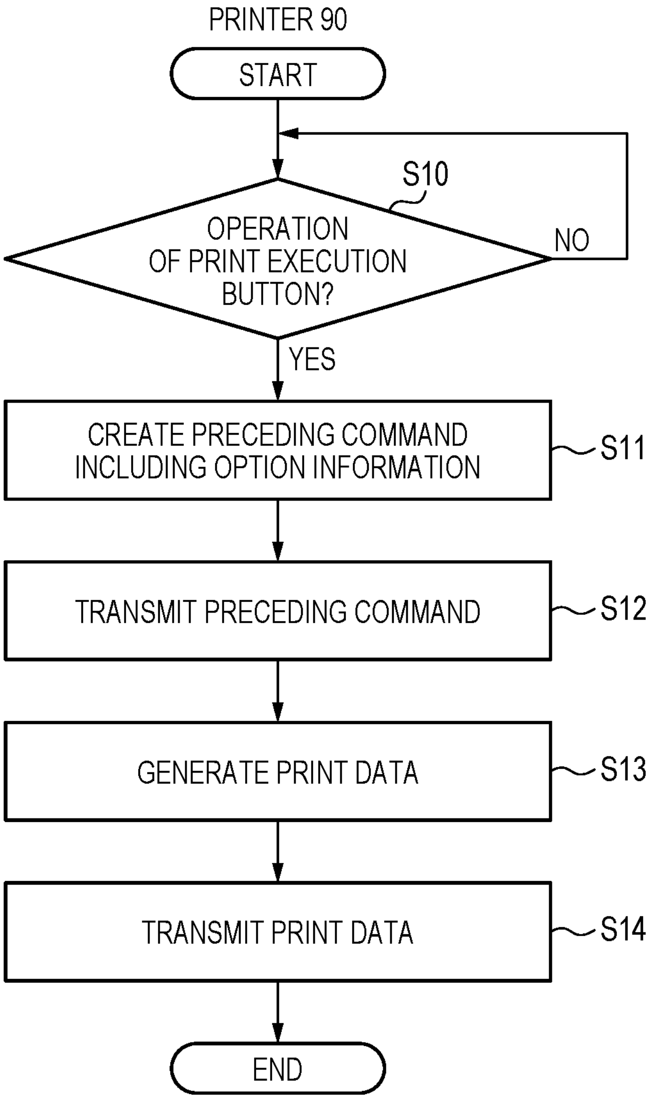
FIG. 3 is a flowchart showing a procedure of a processing performed by a PC.

In step S10 of FIG. 3, in a case where a print execution button is operated (step S10: YES), the printer driver 91 of the PC 90 proceeds to step S11 and generates a preceding command including option information. The preceding command is transmitted to the printer 80 before transmission of print data to the printer 80. The option information includes sheet size designation information designating a size of the sheet M on which an image is formed, sheet type designation information designating a sheet type, print mode designation information designating a print mode (monochrome, color), and user information indicating a user that created the print data.

For example, in a case where the printer 80 and the PC 90 are connected by the LAN IF 16, the option information may be described in a printer job language (PJL). On the other hand, in a case where the printer 80 and the PC 90 are connected by the USB IF 15, the option information may be described by a command in a USB control transfer format.

In step S12, the PC 90 is configured to transmit the preceding command including the option information generated in step S11 to the printer 80. As described above, the printer 80 is connected to the PC 90 by either the USB IF 15 or the LAN 1F16, and the controller 10 of the printer 80 is configured to receive the preceding command through either the IF 15 or 16.

In step S13, the PC 90 is configured to generate print data, using the printer driver 91. The print data is also called a print job. The print data includes header information, a body, and footer information. The header information includes an IP address of the PC 90 that transmitted the print data, user information indicating a creator of the print data, a name of the print data, print setting information, and the like. The user information included in the print data is the same as the user information included in the preceding command generated in step S11. The body is a portion obtained by converting characters, image data, and the like to be formed into an image, into a language that can be interpreted by the printer 80. The footer information includes page information such as a page number, a creation date, and a creator name.

In step S14, the PC 90 is configured to transmit, to the printer 80, the print data generated in step S13. In a case where the printer driver 91 is a program provided by a vendor different from the vendor of the printer 80 or the printer driver 91 is a universal driver, when the print execution button is operated (step S10: YES), the printer driver 91 proceeds to step S13 without generating the preceding command, and starts generation of the print data.

Figure 4:
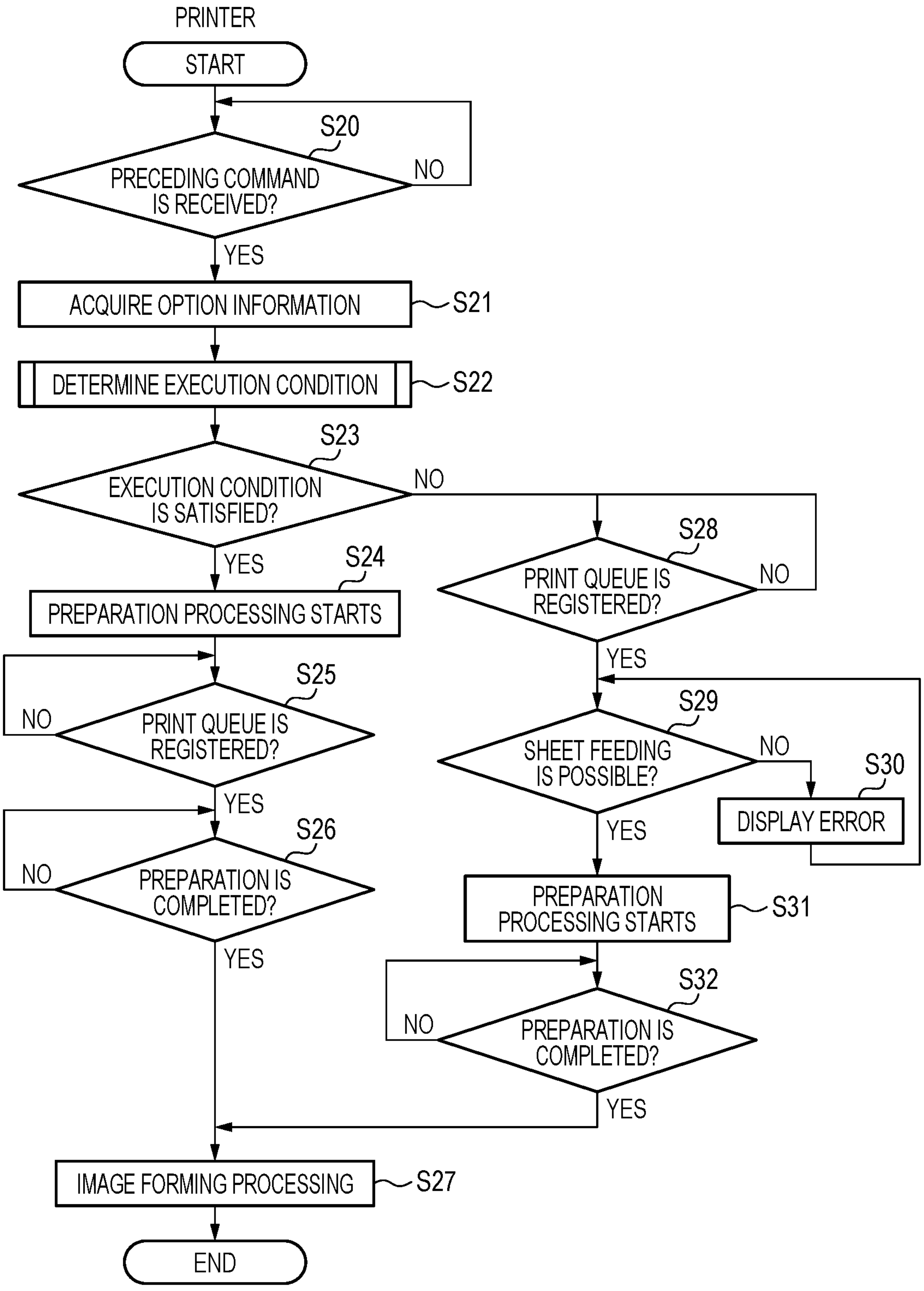
FIG. 4 is a flowchart showing a procedure of a processing performed by the printer.

Next, a procedure of a printing processing performed by the controller 10 of the printer 80 will be described with reference to FIG. 4. In step S20, the controller 10 is configured to determine whether the preceding command is received.

In a case where the preceding command is received from the PC 90 (step S20: YES), the controller 10 is configured to proceed to step S21 and is configured to acquire the option information included in the preceding command. In the present embodiment, the processing performed in step S21 by the controller 10 is an example of an acquisition processing.

Figure 5:
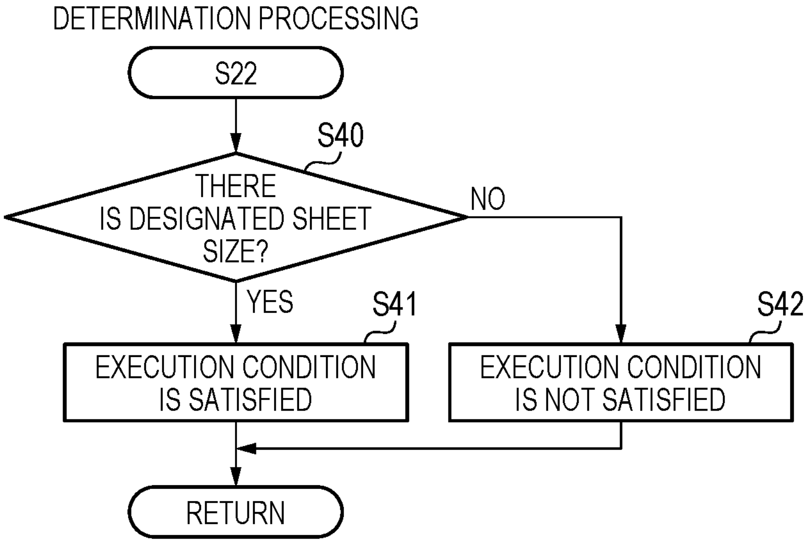
FIG. 5 is a flowchart showing a procedure for determining a performance condition.

In step S22, the controller 10 is configured to determine a performance condition of the printing processing. FIG. 5 is a flowchart showing a procedure for determining the performance condition of the printing processing executed in step S22. In step S40, the controller 10 is configured to determine whether the sheet M having a size designated by the sheet size designation information, which is the option information, is placed on the feed tray 71. In a case where the sheet feeder 70 includes a sensor configured to directly detect the size of the sheet M placed on the feed tray 71, the controller 10 may be configured to perform the determination in step S40, based on whether the size of the sheet M detected by the sensor matches the size indicated by the sheet size designation information.

In a configuration in which the sheet feeder 70 determines, in advance, the size of the sheet M placed on the feed tray 71, the controller 10 may be configured to perform the determination in step S40 as follows. In this case, in a case where there is no feed tray 71 on which a sheet having a size indicated by the sheet size designation information is designated, the controller 10 may be configured to determine that there is no designated sheet size in step S40 (step S40: NO).

In a case where the sheet M having the designated size is placed on the feed tray 71 (step S40: YES), the controller 10 proceeds to step S41 and sets a status flag to a value indicating that the performance condition of the printing processing is satisfied. On the other hand, in a case where no sheet M having the designated size is placed on the feed tray 71 (step S40: NO), the controller 10 proceeds to step S42 and sets the status flag to a value indicating that the performance condition of the printing processing is not satisfied.

Returning to FIG. 4, in step S23, in a case where the status flag set in step S22 indicates that the performance condition of the printing processing is satisfied (step S23: YES), the printing processing can be performed, and thus the controller 10 proceeds to step S24 and starts a preparation processing. That is, the preparation processing is performed in response to the acquisition of the preceding command. The preparation processing is a processing of rotating the pressure roller 38, of raising the temperature of the heating roller 39 by the heater 40 before image formation on the sheet M. The preparation processing is performed according to a procedure shown in FIG. 6.

First, before the description of the preparation processing with reference to FIG. 6, significance of performing the preparation processing in response to the acquisition of the preceding command will be described with reference to FIG. 7. FIG. 7 shows transition of time from the generation of the preceding command by the PC 90 to the execution of image formation by the printer 80. As shown in FIG. 7, in a case where the performance condition of the printing processing is satisfied, the printer 80 is configured to start the preparation processing in response to completion of the acquisition of the preceding command at time t1. Thereafter, the printer 80 completes acquisition of print data at time t2 and starts a RIP processing. After the RIP processing is completed, the printer 80 can immediately start forming an image on the sheet M at time t3.

Figure 6:
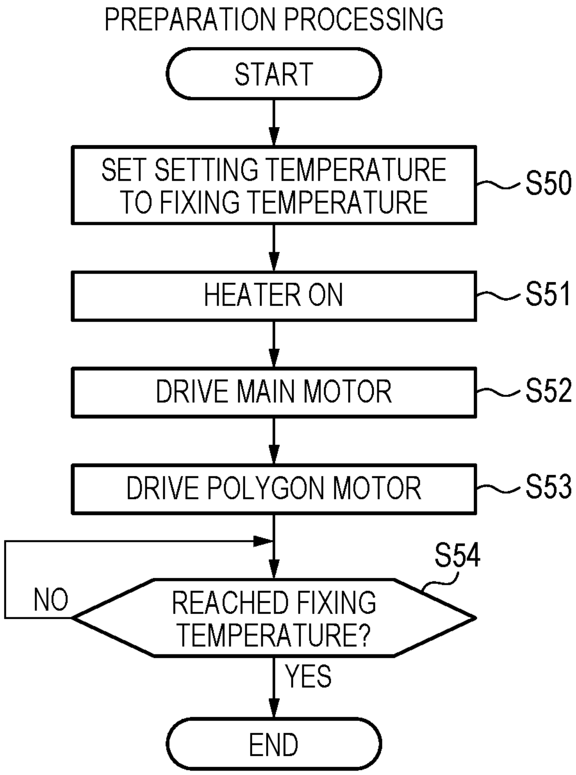
FIG. 6 is a flowchart showing a procedure of a preparation processing.
Figure 7:
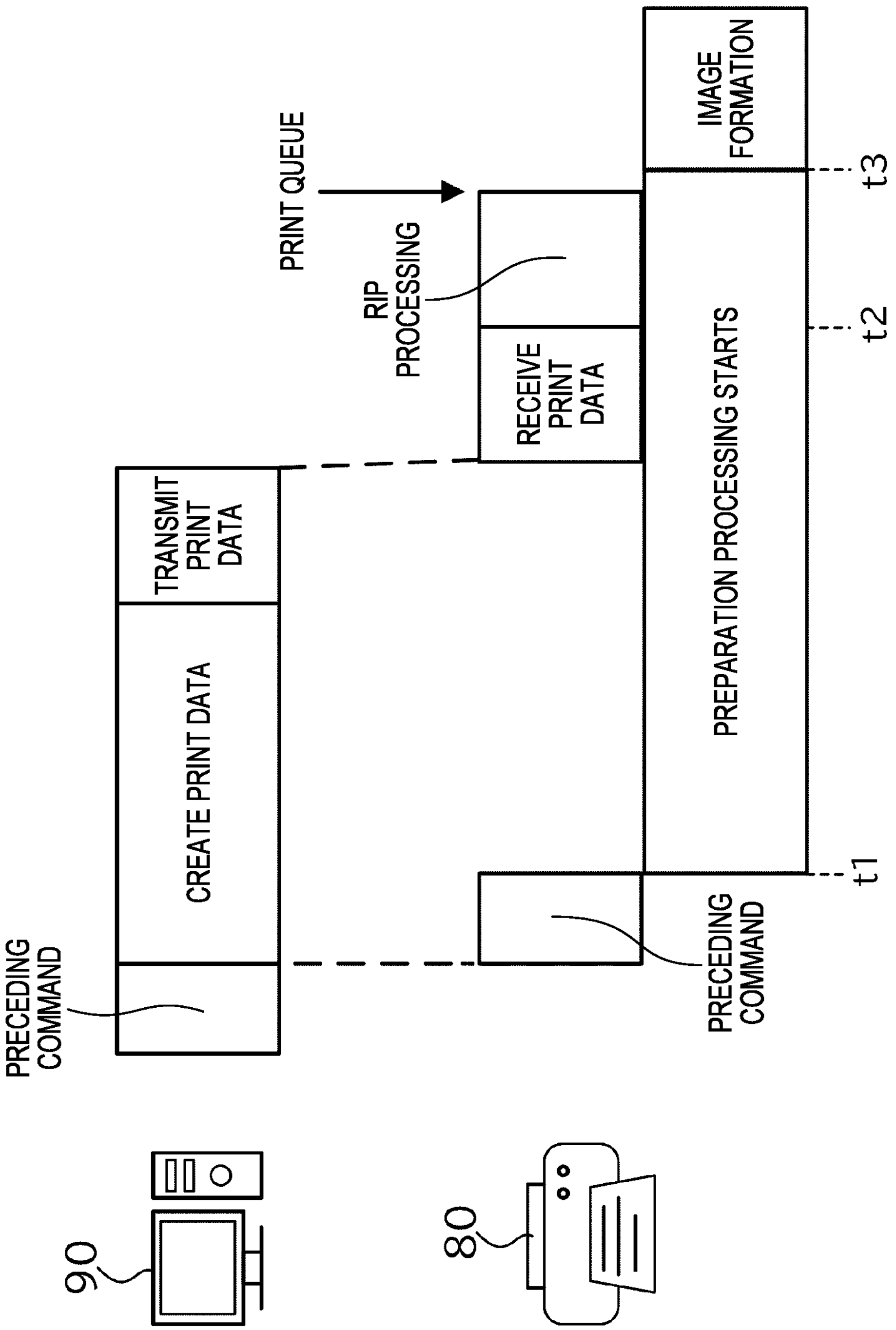
FIG. 7 is a timing chart showing a relationship between the preparation processing and image formation on a sheet.

In step S50 of FIG. 6, the controller 10 is configured to set a setting temperature of the heater 40 to the fixing temperature. The fixing temperature is a temperature required for the heating roller 39 to thermally fix the image formed on the sheet M.

In step S51, the controller 10 is configured to turn on the heater 40 to start heating the heating roller 39. In step S52, the controller 10 is configured to start driving the main motor 20 to rotate the pressure roller 38. As shown in FIG. 2, the main motor 20 is configured to supply a driving force to the photosensitive drum 35 and the developing roller 36, in addition to the pressure roller 38. Accordingly, the photosensitive drum 35 and the developing roller 36 is configured to be rotated by the driving of the main motor 20 in step S52.

Rotational speeds of the photosensitive drum 35, the developing roller 36, and the pressure roller 38 in step S52 may be set to predetermined rotational speeds. In this case, the rotational speeds may be set to either a first speed or a second speed lower than the first speed. For example, in a case where the first speed is a full speed, the second speed may be 75% of the full speed or 25% of the full speed.

In step S53, the controller 10 is configured to drive the polygon motor 30 to rotate the polygon mirror 31. In step S54, the controller 10 is configured to determine whether the temperature of the heating roller 39 reached the fixing temperature, based on a detection result of the temperature sensor 41. In a case where the temperature of the heating roller 39 did not reach the fixing temperature (step S54: NO), the controller 10 waits. On the other hand, in a case where the temperature of the heating roller 39 reached the fixing temperature (step S54: YES), the controller 10 is configured to end the preparation processing.

Referring back to FIG. 4, in step S25, it is determined whether a print queue for one page is registered. In parallel with the processing shown in FIG. 4, the controller 10 is configured to perform a processing shown in FIG. 8 when receiving print data from the PC 90. In step S60 of FIG. 8, the controller 10 is configured to determine whether the print data is received from the PC 90. In a case where the print data is received (step S60: YES), the controller 10 proceeds to step S61 and starts the RIP processing. The RIP processing is a processing of interpreting the print data to generate image data for forming an image on the sheet M. In the present embodiment, the image data is raster data. By performing the RIP processing, the controller 10 is configured to analyze the print data stored in the RAM 13, is configured to generate image data for one page, and is configured to store the image data in the page memory 51.

In a case where the generation of the image data for one page is completed by the RIP processing (step S62: YES), the controller 10 proceeds to step S63 and registers a print queue corresponding to the image data for one page. In step S64, the controller 10 is configured to determine whether the RIP processing on the print data is completed. In a case where the print data corresponds to one page, the controller 10 is configured to determine an end of the RIP processing by registering the print queue corresponding to the image data for one page. On the other hand, in a case where the print data corresponds to plural pages and no print queues are registered for image data for all pages analyzed from the print data, the controller 10 returns to step S62, and repeats the determination of the generation of the image data for one page (step S62) and the registration of the print queue corresponding to the generated image data for one page (step S63). When determining that the RIP processing is completed (step S64: YES), the controller 10 ends the processing shown in FIG. 8.

Figure 8:
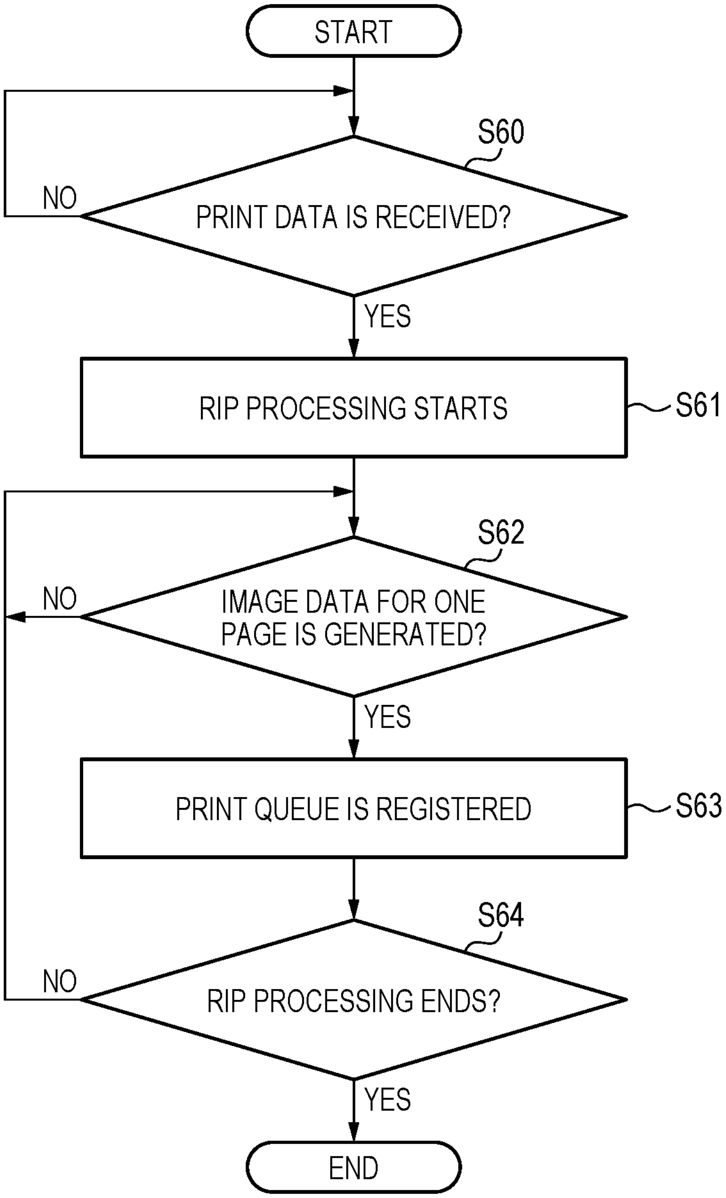
FIG. 8 is a flowchart showing a procedure of a RIP processing.

Returning to FIG. 4, in a case where the print queue for one page is registered by the processing of step S63 of FIG. 8 (step S25: YES), the controller 10 proceeds to step S26 and determines whether the preparation processing started by the processing of step S24 is completed. In the present embodiment, the controller 10 is configured to determine that the preparation is completed, in a case where the temperature of the heating roller 39 detected by the temperature sensor 41 reaches the fixing temperature.

In step S27, the controller 10 is configured to refer to the print queue and is configured to perform an image forming processing on the sheet M, using the image data stored in the page memory 51. In the image forming processing on the sheet M, a latent image is formed on the photosensitive drum 35 using the image data, and a toner image is formed on the photosensitive drum 35 by the toner supplied from the developing roller 36. Then, an image is formed on the sheet M passing through the transfer position between the photosensitive drum 35 and the transfer roller 34. Thereafter, the sheet M is heated and held at the nip portion between the pressure roller 38 and the heating roller 39, and the image formed on the sheet M is thermally fixed. When finishing the image forming processing on the sheet M, the controller 10 stops driving the main motor 20 and the polygon motor 30.

On the other hand, in step S23, in a case where the status flag is a value indicating that the performance condition of the printing processing is not satisfied (step S23: NO), the controller 10 proceeds to step S28. In this example, no sheet M having the size designated by the sheet size designation information, which is the option information, is placed on the feed tray 71, and the status flag is set to a value indicating that the performance condition is not satisfied in step S42 of FIG. 5.

In step S28, the controller 10 is configured to determine whether a print queue for one page is registered. If no print queue for one page is registered, the controller 10 waits. On the other hand, in a case where the print queue for one page is registered (step S28: YES), the controller 10 proceeds to step S29 and determines whether sheet feeding is possible.

In a case where the sheet M having the size indicated by the sheet size designation information, which is the option information, cannot be fed (step S29: NO), the controller 10 proceeds to step S30 and displays an error on the operation panel 11. In this case, unless a user sets the sheet M having the size indicated by the sheet size designation information on the feed tray 71, the controller 10 is configured to continue displaying the error on the operation panel 11 and configured not to perform the printing processing.

Figures 9A, 9B:
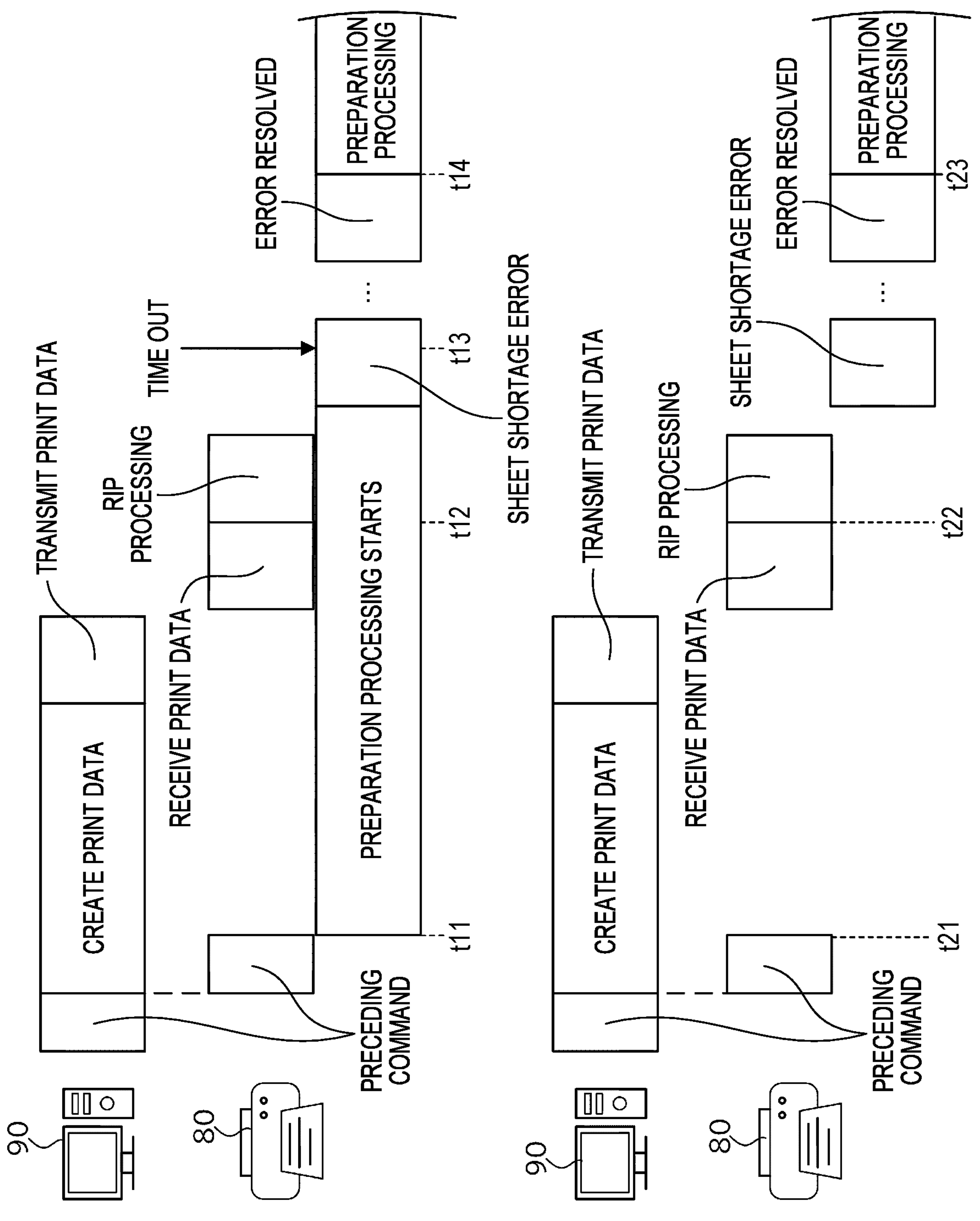
FIG. 9A is a timing chart showing a relationship between the preparation processing and the image formation on a sheet.
FIG. 9B is a timing chart showing a relationship between the preparation processing and the image formation on a sheet.

FIG. 9A shows transition of time from the generation of the preceding command by the PC 90 to the performance of the image forming processing by the printer 80, according to a comparative example. FIG. 9B shows transition of time from the generation of the preceding command by the PC 90 to the performance of the image forming processing by the printer 80, according to the present embodiment. As shown in FIG. 9A, even after the printer 80 completes the acquisition of the print data at time t12 and executes the RIP processing, the image forming processing on the sheet M cannot be started in a case where a sheet shortage error continues. In this case, the image forming processing on the sheet M cannot be started at time t14 in a case where the sheet M having the size designated by the sheet size designation information is supplied to the feed tray 71 and the error is resolved. For this reason, in a case where the preparation processing is started in response to the acquisition of the preceding command at time t11, the preparation processing is required to continue until the error is resolved at time t14. In the example shown in FIG. 9A, a timeout error occurs at time t13, and the preparation processing is interrupted. For this reason, after the time t14 at which the image forming processing on the sheet M is possible, the controller 10 performs the preparation processing again and then performs the image forming processing.

On the other hand, in the present embodiment as shown in FIG. 9B, in a case where the performance condition of the printing processing is not satisfied, the preparation processing is not started even in a case where the printer 80 receives the preceding command at time t21. After completing the acquisition of the print data at time t22 and starting the RIP processing, the printer 80 starts the preparation processing after an error state is resolved at time t23. Accordingly, execution of an unnecessary preparation processing can be prevented.

Referring back to FIG. 4, in a case where the user sets the sheet M having the size indicated by the sheet size designation information on the feed tray 71, the controller 10 is configured to resolve the error state (step S29: YES), proceeds to step S31, and starts the preparation processing. The preparation processing performed in accordance with the processing in step S31 is the same processing as the processing described in FIG. 6, and thus the description thereof will be omitted. In a case where the controller 10 determines that the preparation processing is completed (step S32: YES), the controller 10 proceeds to step S27 and performs the image forming processing on the sheet M. In the present embodiment, the processing performed by the controller 10 in step S27 is an example of the printing processing.

The present embodiment described above can achieve the following effects. In a case where the controller 10 determines that the sheet M having the size designated by the option information included in the preceding command is placed on the feed tray 71 and that the printing processing is able to be performed, the controller 10 performs the preparation processing in response to the acquisition of the preceding command and then performs the printing processing according to the registration of the print queue. On the other hand, in a case where the controller 10 determines that the sheet M having the size designated by the option information is not placed on the feed tray 71 and the printing processing is not able to be performed, the controller 10 is configured not to perform the preparation processing in response to the acquisition of the preceding command. Thereafter, in a case where the sheet M having the size specified by the option information is set on the feed tray 71, the preparation processing and the printing processing are performed according to the registration of the print queue for one page. Accordingly, unnecessary preparation processing can be prevented from being performed in a case where a sheet having a size designated by the print data is not placed on the feed tray 71.

In the preparation processing, the controller 10 is configured to control driving of the main motor 20 to rotate the photosensitive drum 35 and the developing roller 36. Accordingly, it is possible to reduce consumption due to abrasion or the like associated with the rotation of the photosensitive drum 35 and the developing roller 36 due to performance of an unnecessary preparation processing.

In the preparation processing, the controller 10 is configured to control driving of the polygon motor 30 to rotate the polygon mirror 31. This makes it possible to prevent an increase in power consumption associated with rotation of the main motor 20 and the polygon motor 30 due to performance of an unnecessary preparation processing.

After acquiring the preceding command from the PC 90, the controller 10 is configured to receive the print data, is configured to create image data from the print data by the RIP processing, and is configured to register the print queue. The controller 10 sets, as a print instruction, the registration of the print queue for one page. Accordingly, since the preparation processing is performed when the image data for one page is registered in the print queue, time required for printing can be prevented from being long.

Modifications of First Embodiment

In the present embodiment, the fuser 21 includes the heating roller 39, the pressure roller 38, and the heater 40, and the pressure roller 38 is rotated by the main motor 20, but the present invention is not limited thereto. For example, the fuser 21 may include a heater, a nip plate configured to receive radiant heat from the heater, a heating belt configured to rotate around the nip plate, and a pressure roller, and the heating belt may be rotated by a main motor.

The fuser 21 may include a substrate on which a heat generating pattern is formed, a belt configured to rotate around the substrate, and a pressure roller, the substrate may be in contact with the belt, and the belt may be rotated by the main motor 20.

The fuser 21 may include a heating roller, a heater, and a pressure belt, and the pressure belt may be rotated by the main motor 20.

Second Embodiment

In the second embodiment, configurations different from those in the first embodiment will be mainly described. In the second embodiment, the same parts as those in the first embodiment are denoted by the same reference numerals, and description thereof will not be repeated. The present embodiment differs from the first embodiment in a condition for determining a timing to start a preparation processing.

In the present embodiment, the printer 80 is a color printer, and the printer 80 includes plural drum cartridges 19 corresponding to colors other than black (for example, cyan, yellow, and magenta). Accordingly, the image forming unit 17 of the printer 80 is configured to form an image having different colors on the sheet M.

In a case where an image having plural colors is formed on the sheet M, positions where the toner of the colors is formed may be shifted, and accordingly a so-called color shift may occur. In the present embodiment, to correct the color shift, the controller 10 is configured to perform a color shift correction processing. In the color shift correction processing, the controller 10 is configured to control the image forming unit 17 to form a patch for color shift correction on a surface of a transfer belt, and is configured to detect, by a sensor that is not shown, an intensity of reflected light of the belt in a range where the patch is formed, in a detection position. Then, the controller 10 is configured to change a printing condition such that a position of the transfer belt in a moving direction in a range in which the detected intensity of the reflected light is larger than a predetermined threshold coincides with a reference position. By performing this change for each color of the toner, the color shift can be corrected. The above-described content is an example of the color shift correction processing, and the color shift correction processing may be performed by various methods.

Figure 10:
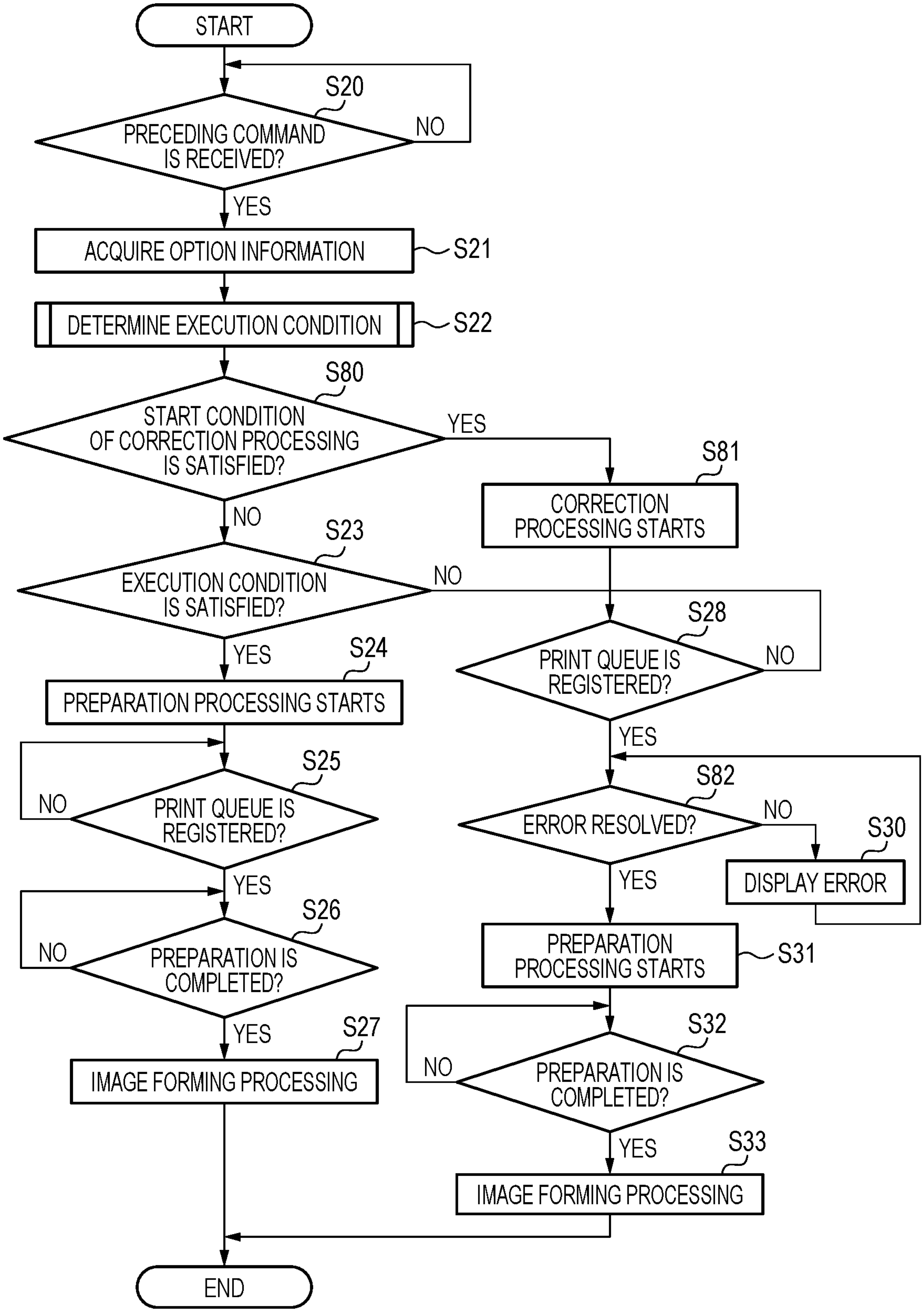
FIG. 10 is a flowchart showing a procedure of a processing performed by a printer.

FIG. 10 is a flowchart showing a procedure of a printing processing performed by the controller 10 according to the second embodiment. In a case where the preceding command is received from the PC 90 (step S20: YES), the controller 10 is configured to proceed to step S21 and is configured to acquire the option information included in the preceding command. In step S22, the controller 10 is configured to determine a performance condition of the printing processing.

Figure 11:
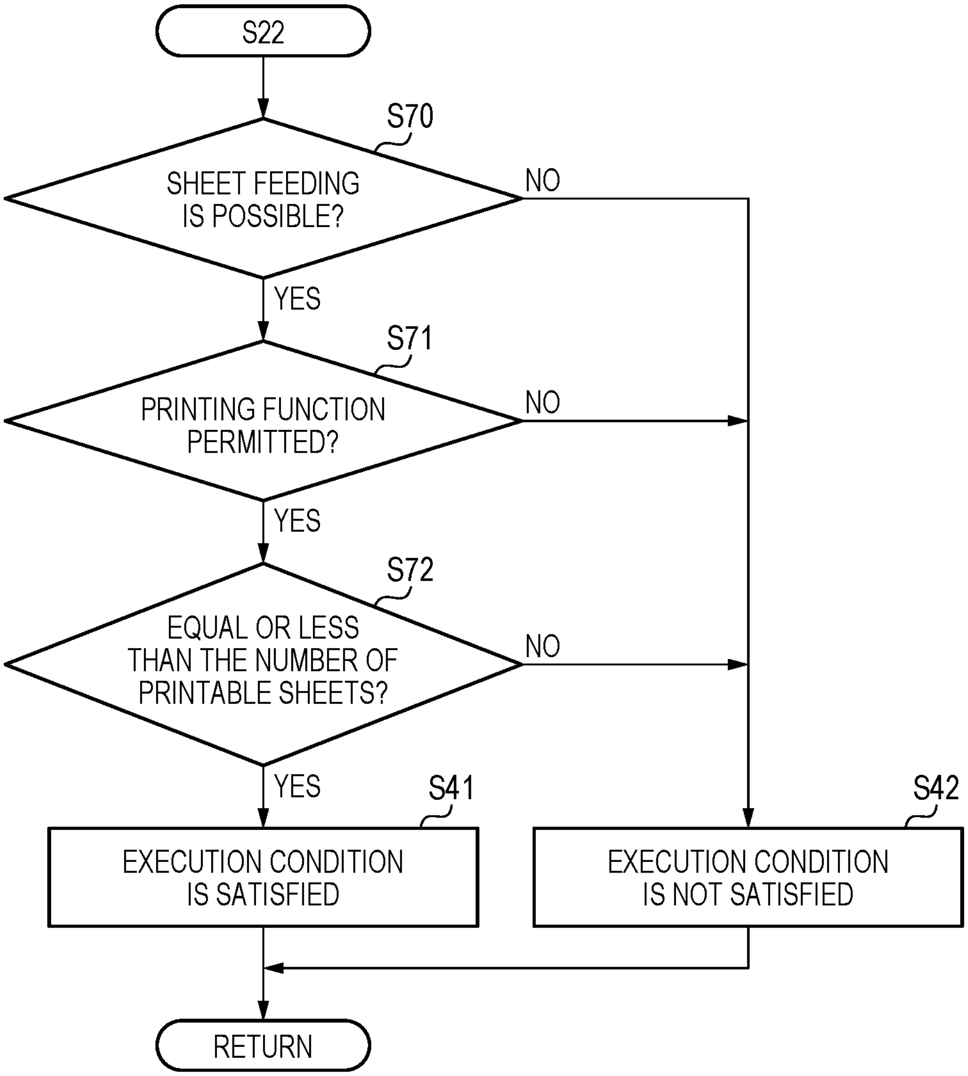
FIG. 11 is a flowchart showing a procedure of a processing performed in step S22 of FIG. 10.

FIG. 11 is a flowchart showing a procedure for determining the performance condition of the printing processing performed in step S22 according to the second embodiment. In step S70, the controller 10 is configured to determine whether the sheet M having a size designated by sheet size designation information can be fed. In a case where the sheet M having the designated size cannot be fed (step S70: NO), the controller 10 proceeds to step S42 and sets a status flag to a value indicating that the performance condition of the printing processing is not satisfied.

On the other hand, in a case where the sheet M having the designated size can be fed (step S70: YES), the controller 10 proceeds to step S71 and determines whether the printing processing is permitted for a user indicated by user information included in the option information. In the present embodiment, the printer 80 is configured to perform a function lock function. In the function lock function, the user information is registered in the printer 80 in advance, and permission or non-permission of a specific function and restrictions in a case where the function is permitted can be set in association with the registered user information. Specifically, the controller 10 is configured to registers, in a management table stored in the NVRAM 14, the user information and permitted functions and restrictions in association with the user information. In a case where the user indicated by the user information included in the option information matches a user registered in the management table, the controller 10 is configured to determine whether the printing processing associated with the user is permitted and whether the printing processing is restricted. In a case where the printing processing is not permitted for the user indicated by the user information (step S71: NO), the controller 10 proceeds to step S42, and the status flag is set to a value indicating that the performance condition of the printing processing is not satisfied.

In a case where the printing processing is permitted for the user indicated by the user information (step S71: YES), the controller 10 proceeds to step S72 and determines whether the number of printed sheets included in the option information is equal to or less than the number of printable sheets restricted by the function lock function. In a case where the number of printed sheets indicated by the option information exceeds the number of printable sheets (step S72: NO), the processing proceeds to step S42, and the status flag is set to a value indicating that the performance condition of the printing processing is not satisfied. In a case where the number of printed sheets indicated by the option information is equal to or less than the number of printable sheets (step S72: YES), the controller 10 proceeds to step S41 and sets the status flag to a value indicating that the performance condition of the printing processing is satisfied.

Returning to FIG. 10, in step S80, the controller 10 is configured to determine whether a start condition of the color shift correction processing is satisfied. The start condition of the color shift correction processing is that a print mode included in the option information designates color and that a predetermined condition is satisfied. The predetermined condition included in the start condition is that time elapsed from a previous execution of the color shift correction processing exceeds predetermined time, that the cumulative number of printing times from the previous execution of the color shift correction processing exceeds a predetermined number of times, and a timing at which the drum cartridge 19 is replaced. Here, in a case where the start condition of the color shift correction processing is not satisfied (step S80: NO), the controller 10 proceeds to step S23 and determines whether the performance condition of the printing processing is satisfied. In a case where the status flag set in step S22 indicates that the performance condition of the printing processing is satisfied (step S23: YES), the controller 10 proceeds to step S24 and starts the preparation processing. That is, the preparation processing is performed in response to the acquisition of the preceding command.

Thereafter, as described in the first embodiment, in a case where a print queue for one page is registered (step S25: YES), the controller 10 proceeds to step S26 and determines whether the preparation processing started by the processing of step S24 is completed. In a case where the preparation processing is completed (step S26: YES), in step S27, the controller 10 is configured to refer to the print queue and is configured to perform an image forming processing on the sheet M using image data stored in the page memory 51.

On the other hand, in a case where the start condition of the color shift correction processing is satisfied (step S80: YES), the controller 10 proceeds to step S81 and starts the color shift correction processing. In this case, since the image formation on the sheet M is executed after the color shift correction processing is completed, time from when the printer 80 receives the preceding command to when the print queue for one page is registered is longer than when no color shift correction processing is performed. For this reason, in a case where the preparation processing is performed in response to the acquisition of the preceding command in step S20, for example, a timeout error may occur during the continuation of the preparation processing, and the preparation processing may have to be performed again.

In a case where the color shift correction processing is performed in step S81, the controller 10 proceeds to step S28 and determines whether a print queue for one page is registered. In a case where the print queue for one page is registered (step S28: YES), the controller 10 proceeds to step S82 and determines whether an error caused by a fact that the performance condition of the printing processing is not satisfied is resolved. Specifically, in a case of an error due to a fact that the sheet M having the size designated by the sheet size designation information cannot be fed, it is determined that the error is resolved (step S82: YES) in a case where the sheet M having the designated size is set in the feed tray 71, and the processing proceeds to step S31. In addition, in a case where the number of printed sheets designated by the option information is equal to or more than the number of printable sheets restricted by the function lock function, the controller 10 resolves an error state when receiving an operation of changing the number of printed sheets to within the number of printable sheets by an operation on the operation panel 11, in an error display in step S30.

In a case where the performance condition of the printing processing is not satisfied by transmission of print data from a user for whom the printing processing is not permitted by the function lock function, the image formation on the sheet M is not executed. In this case, in the error display in step S30, the controller 10 deletes image data when receiving an operation of deleting image data registered in the print queue on the operation panel 11, and ends the processing of FIG. 10.

In a case where the error is resolved (step S82: YES), the controller 10 proceeds to step S31 and starts the preparation processing. In a case where the controller 10 determines that the preparation processing is completed (step S32: YES), the controller 10 is configured to perform the image forming processing on the sheet M in step S33, as in step S27.

In the present embodiment described above, in a case where permission of the printing processing is registered for the user information indicated by the option information, the controller 10 is configured to determine that the printing processing is able to be perform, is configured to perform the preparation processing in response to the acquisition of the preceding command, and then to perform the printing processing in accordance with a print instruction. In a case where permission of the printing processing is not registered for the user information indicated by the option information, it is determined that the printing processing is not able to be performed, and neither preparation processing nor the printing processing is performed. Accordingly, the function lock function can prevent an unnecessary preparation processing from being performed for a user that is not permitted to form an image.

For a user that is permitted to perform the printing processing, in a case where the number of printable sheets is restricted and the number of printed sheets is larger than the number of printable sheets, no preparation processing is performed in response to the acquisition of the preceding command. Accordingly, the function lock function can prevent an unnecessary preparation processing from being performed for a user whose number of printed sheets is restricted.

In a configuration in which the image forming unit is configured to form an image with toner of plural colors, the controller may be configured to perform the color shift correction processing before the printing processing. In the above configuration, in a case where a condition for executing the color shift correction processing is satisfied, the preparation processing and the printing processing are performed in response to the registration of the print queue. Accordingly, an unnecessary preparation processing can be prevented from being performed in a case where the color shift correction processing is performed.

Modifications of Second Embodiment

The determination of the performance condition executed in step S22 of FIG. 10 may not perform all processing of step S70 to step S72. For example, in a case where the printer 80 does not have the function lock function, the controller 10 may be configured not to execute determinations of step S71 and step S72.

As in the first embodiment, in a case where the printer 80 is a monochrome printer, the color shift correction processing in S81 is not performed. For this reason, the controller 10 may be configured not to determine the start condition of the correction in step S80 of FIG. 10.

Other Embodiments

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiments, a print instruction is that a print queue for one page is registered. Alternatively, in a case where a printing command is transmitted together with print data from the PC 90, the printing command transmitted from the PC 90 may be used as the print instruction.

The image forming apparatus is not limited to a printer, and may be a multifunction peripheral including a reading unit that reads an image and a FAX IF.

What is claimed is:

1. An image forming apparatus comprising:

a communication interface configured to receive data from an external terminal;

an image forming unit configured to form an image on a sheet;

a fuser configured to fix the image to the sheet, the fuser including:

a heating rotator;

a heater configured to heat the heating rotator; and a pressure rotator configuring a nip portion in which the sheet is nipped between the pressure rotator and the heating rotator;

a main motor configured to transmit a driving force for rotating one of the pressure rotator or the heating rotator; and a controller configured to perform:

an acquisition processing of acquiring a preceding command from the external terminal via the communication interface, and of analyzing the acquired preceding command to acquire option information, after the acquisition processing, a RIP processing of:

receiving a print data via the communication interface;

interpreting the print data to generate image data for one page at a time; and in a case where the image data for the one page is stored in a page memory, registering a print queue corresponding to the image data for the one page, a preparation processing of heating the heating rotator using the heater to raise a temperature of the heating rotator to a fixing temperature, of maintaining the fixing temperature, and of controlling driving of the main motor to rotate the pressure rotator and the heating rotator, and after performing the preparation processing, a printing processing of forming, using the image forming unit, an image on a sheet according to print data received via the communication interface, and of fixing the image formed on the sheet using the fuser, wherein the preceding command is generated by the external terminal before the print data is generated by the external terminal, and the preceding command is received from the external terminal before receiving the print data from the external terminal, in a case where the controller determines that a performance condition of the printing processing indicated by the option information is satisfied and the printing processing is able to be performed, the controller is configured to perform:

the preparation processing in response to acquisition of the preceding command; and in a case where the print queue corresponding to the image data for one page is registered in the RIP processing and the preparation processing is completed, the printing processing in accordance with the print queue, and in a case where the controller determines that the performance condition is not satisfied and the printing processing is not able to be performed, the controller is configured to register the print queue in the RIP processing, and in a case where the controller determines that the performance condition is satisfied after the controller determines that the performance condition is not satisfied and the printing processing is not able to be performed, the controller is configured to perform the preparation processing and the printing processing in accordance with the print queue.

2. The image forming apparatus according to claim 1, further comprising:

a feed tray on which a sheet is placed, wherein the option information includes the performance condition, the performance condition designating a size of a sheet on which an image is formed by the image forming unit, and in a case where the controller determines that a sheet having a size indicated by the option information is not placed on the feed tray and the performance condition is not satisfied, the controller is configured:

to determine that the printing processing is not able to be performed; and not to perform the preparation processing in response to the acquisition of the preceding command, and in a case where the controller determines that the performance condition is satisfied after the controller determines that the performance condition is not satisfied, the controller is configured to perform the preparation processing and the printing processing in accordance with the print instruction.

3. The image forming apparatus according to claim 1, further comprising:

a feed tray on which a sheet is placed, wherein the option information includes the performance condition, the performance condition designating a size of a sheet on which an image is formed by the image forming unit, and in a case where the controller determines that the feed tray on which a sheet having a size indicated by the option information is placed is not provided and the performance condition is not satisfied, the controller is configured:

to determine that the printing processing is not able to be performed; and not to perform the preparation processing in response to the acquisition of the preceding command, and in a case where the controller determines that the performance condition is satisfied after the controller determines that the performance condition is not satisfied, the controller is configured to perform the preparation processing and the printing processing in accordance with the print instruction.

4. The image forming apparatus according to claim 1, further comprising:

a storage, wherein the storage is configured to store first user information indicating a user permitted to perform the printing processing in the image forming apparatus, the option information includes second user information indicating a user that transmits print data, in a case where the controller determines that the second user information indicated by the option information and the first user information stored in the storage indicate identical user, the controller is configured to:

determine that the printing processing is able to be performed, perform the preparation processing in response to the acquisition of the preceding command, and perform the printing processing in accordance with the print instruction, and in a case where the controller determines that the user second information indicated by the option information and the first user information stored in the storage do not indicate identical user, the controller is configured:

to determine that the printing processing is not able to be performed; and not to perform the preparation processing and the printing processing.

5. The image forming apparatus according to claim 4, wherein the storage is configured to store the number of printable sheets for one of the print instruction in association with the first user information, the option information includes information designating the number of sheets to be printed for one of the print instruction in association with the second user information, in a case where the controller determines that the second user information indicated by the option information and the first user information stored in the storage indicate identical user and the number of sheets to be printed indicated by the option information is equal to or less than the number of printable sheets stored in the storage, the controller is configured to:

determine that the printing processing is able to be performed, perform the preparation processing in response to the acquisition of the preceding command, and perform the printing processing in accordance with the print instruction, and in a case where the second user information indicated by the option information and the first user information stored in the storage indicate identical user and the number of sheets to be printed indicated by the option information is larger than the number of printable sheets stored in the storage, the controller is configured:

to determine that the printing processing is not able to be performed; and not to perform the preparation processing and the printing processing.

6. The image forming apparatus according to claim 1, wherein the image forming unit is configured to form an image having mutually different colors, the controller is configured to perform a color shift correction processing of correcting color shift of an image recorded by the image forming unit, before performing the printing processing, the option information includes information indicating whether the image forming unit is configured to form an image in color or to form an image in monochrome, and in a case where the performance condition indicated by the option information analyzed from the preceding command indicates that the image is formed in color and a start condition of color shift correction is satisfied, the controller is configured:

not to perform the preparation processing in response to the acquisition of the preceding command, to perform the color shift correction processing, and to perform the preparation processing and the printing processing in accordance with the print instruction.

7. The image forming apparatus according to claim 1, wherein the image forming unit includes:

a photosensitive drum;

a developing roller configured to supply toner to the photosensitive drum; and a transfer member configured to transfer, to a sheet, a toner image formed on the photosensitive drum, the main motor is configured to transmit a driving force to the photosensitive drum and the developing roller, and in the preparation processing, the controller is configured to control driving of the main motor to rotate the photosensitive drum and the developing roller.

8. The image forming apparatus according to claim 7, wherein the image forming unit includes:

a polygon mirror configured to deflect a light beam emitted from a light source to expose the photosensitive drum; and a polygon motor configured to supply a driving force for rotating the polygon mirror, and in the preparation processing, the controller is configured to control driving of the polygon motor to rotate the polygon mirror.

9. An image forming system comprising:

the image forming apparatus according to claim 1; and an external terminal configured to:

generate a preceding command;

transmit the preceding command to the image forming apparatus;

generate print data, after generating the preceding command;

transmit the print data to the image forming apparatus, after transmitting the preceding command to the image forming apparatus.

* * * * *